United States Patent [19]

Gastreich

[11] Patent Number: 5,029,765
[45] Date of Patent: Jul. 9, 1991

[54] FILAMENT GRIPPER

[75] Inventor: Raymond P. Gastreich, Tucson, Ariz.

[73] Assignee: Hughes Aircraft Company, Los Angeles, Calif.

[21] Appl. No.: 440,968

[22] Filed: Nov. 22, 1989

[51] Int. Cl.$^5$ ............................................. B65H 54/04
[52] U.S. Cl. .................................... 242/47; 242/18 R; 242/18 G
[58] Field of Search ................. 242/47, 1, 18 G, 18 R, 242/53

[56] References Cited

U.S. PATENT DOCUMENTS 3,586,563  6/1971  Fukami et al. ............... 242/47 X
4,630,652  12/1986  Dieterich ..................... 242/47 X

FOREIGN PATENT DOCUMENTS 128167  7/1984  Japan ........................... 242/47

Primary Examiner—Stanley N. Gilreath
Attorney, Agent, or Firm—C. D. Brown; R. M. Heald; W. K. Denson-Low

[57] ABSTRACT

A pair of grippers or clampers (34) are arranged at opposite ends of a drum (14) that is to be provided with a wound optical fiber (12) pack. When a winding layer is being finished and a new layer is about to be started a clamper (34) is actuated to engage the last few windings and hold them in place while the new winding is initiated.

9 Claims, 3 Drawing Sheets

FILAMENT GRIPPER

BACKGROUND OF THE INVENTION

1. Field of the Invention

The invention pertains generally to the winding of a filament onto a bobbin or canister for use as a data link, and, more particularly, for apparatus to secure the last several windings on an end portion of a canister attendant the beginning of an upper winding layer.

2. Description of the Prior Art

Many present day missile weapons include an extended length of a filament such as a wire or optical fiber wound onto a canister, one end of which is connected to apparatus aboard the missile and the other end being connected to apparatus at the launch site. On launch, the filament unwinds maintaining via the data link as a communications line for controlling the missile. Since an optical fiber is a preferred form of filament for this purpose, it will be used hereafter.

In winding the optical fiber onto the canister, it is important not to stretch or kink the fiber since this can substantially deteriorate the quality of a light signal being transmitted. One particular difficulty encountered in the winding of an optical fiber is that on moving from the end of one winding layer to the beginning of the next, the fiber is twisted out of the plane of the lower winding layer as well as being raised radially upwardly producing a "micro bend" which must be kept as small as possible to prevent the deterioration of the signal transmission already noted.

In certain other situations, the layers are applied onto a tapered canister so that an upper layer may start a number of turns back from the end of the underlying layer which complicates the winding procedure and the prevention of bending, stressing or micro bending during the winding.

Irrespective of the canister form it is necessary to set a specific transition point between layers during a fiber spooling operation. In the past, this has only been successfully accomplished manually where the operator had to set each layer end transition by hand. Of course, this is a very difficult and unreliable way of setting a layer end transition and it is desirable to be able to accomplish this by a machine control technique.

SUMMARY OF THE IVENTION

A canister, either uniformly cylindrical or tapered cylindrical in shape, is mounted for rotation about its longitudinal axis and driven about this axis to wind an optical fiber in layers of the required amount onto its circumferential periphery. There are provided radially opposite the end portions of the canister first and second devices arranged for movement transversely of the canister to selectively press against the uppermost end few windings or to move free from contact with the fibers. The two grippers are identical to one another and each include an actuator arm having one end connected to a solenoid or magnetic actuator and the other end secured to a relatively soft foam rubber pad extending substantially 90 degrees to the actuator arm.

In the unenergized condition, the fiber grippers are spaced radially outward of the fiber windings and located respectively directly opposite the end portions of outermost fiber winding layer. On energization, the actuator arm pulls the fiber gripping pad down to lightly clamp the last few turns of the then outermost fiber layer in place while a new fiber layer is initiated.

The described fiber winding gripping apparatus enables precise controlling of the end of one fiber layer and the beginning of the one immediately following it within acceptable tolerances. This gripping is maintained for just less than a full revolution of the gripping pressure and the gripping pads must be soft and the clamping or gripping pressure light so as not to damage the fiber during the transition period from one layer to the next.

DESCRIPTION OF A PREFERRED EMBODIMENT

Figure 1:
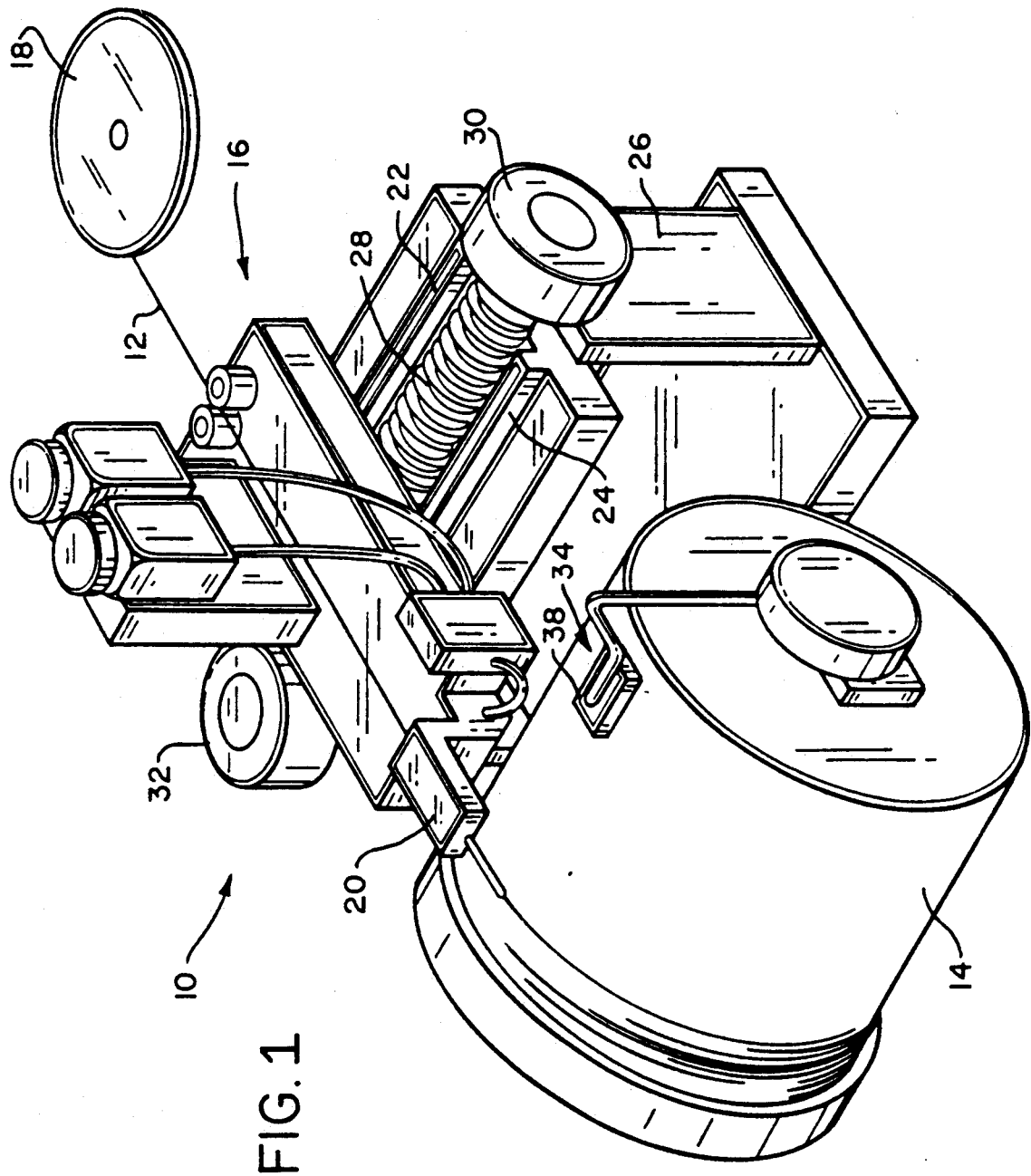
FIG. 1 is a perspective view of fiber optic winding apparatus including the present invention.

Turning now to the drawings and particularly FIG. 1, apparatus for winding an optical fiber onto a cylindrical drum frequently referred to as a canister, when it is being used as a data link for a missile, is identified generally as 10. In general operation, the apparatus lays down a plurality of layers of an optical fiber 12 onto the peripheral surface of a generally cylindrical canister 14 having a taper. The fiber windings are wound first from left to right and then the immediately succeeding layer is wound right to left with subsequently succeeding layers being laid down in the same manner. Since a data link canister when used as a dispenser on a missile is frequently payed out from one end of the canister, a commonly preferred form for the canister is that of a tapered cylinder with payout made from the smaller end. Accordingly, the operation of the invention will be described in the context of winding such a tapered canister 14.

A movable fiber guide 16 receives the fiber 12 from a storage spool 18 and directs it via a feed head 20 to a precise location on the canister. The fiber guide is slidingly mounted on the top surface of a pair of spaced apart rails 22 and 24 located on the tops of a support stanchion 26 for movement along a path parallel to the cylindrical axis of the canister. A spiral drive screw 28 journaled to the support stanchion between the two rails interconnects with a gear on the underneath of the fiber guide (not shown) to move the guide and (thus the fiber) along a path parallel to the canister in order to lay down each fiber winding in its correct place in a winding layer. Reversal of the drive screw direction causes the guide 16 and fiber to move along the same path but in a reverse direction for winding the next layer. Actuation is shown as provided by a hand operated knob 30, or, alternatively, by an electrical or hydraulic rotative power source.

An elevation knob 32 is adjustable for moving the guide 16, fiber feed head 20 and fiber vertically with respect to the canister to accommodate the addition of further winding layers and then to position the guide back to a lower level on beginning the winding of a new canister.

Figure 2:
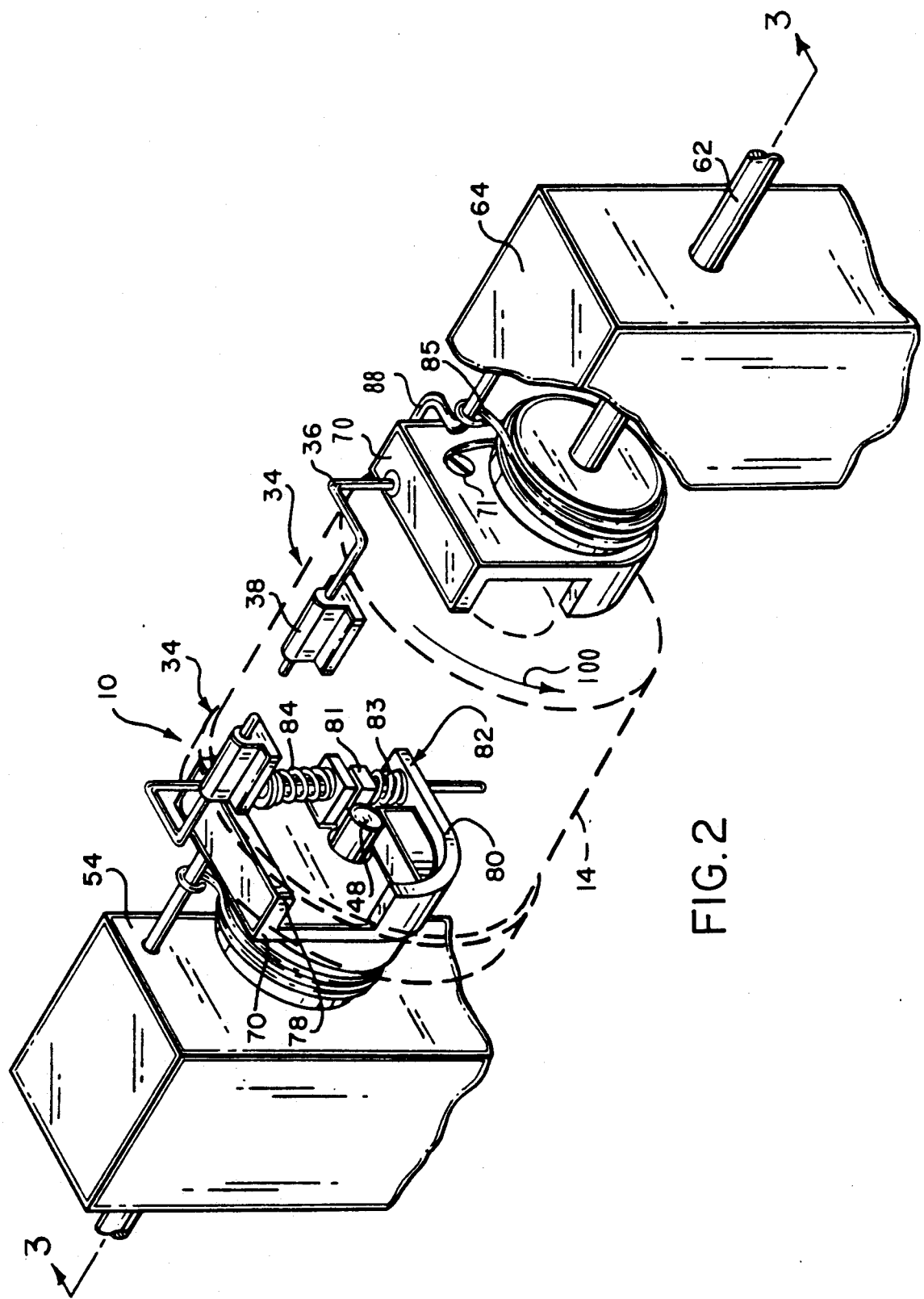
FIG. 2 is a further perspective view.
Figure 3:
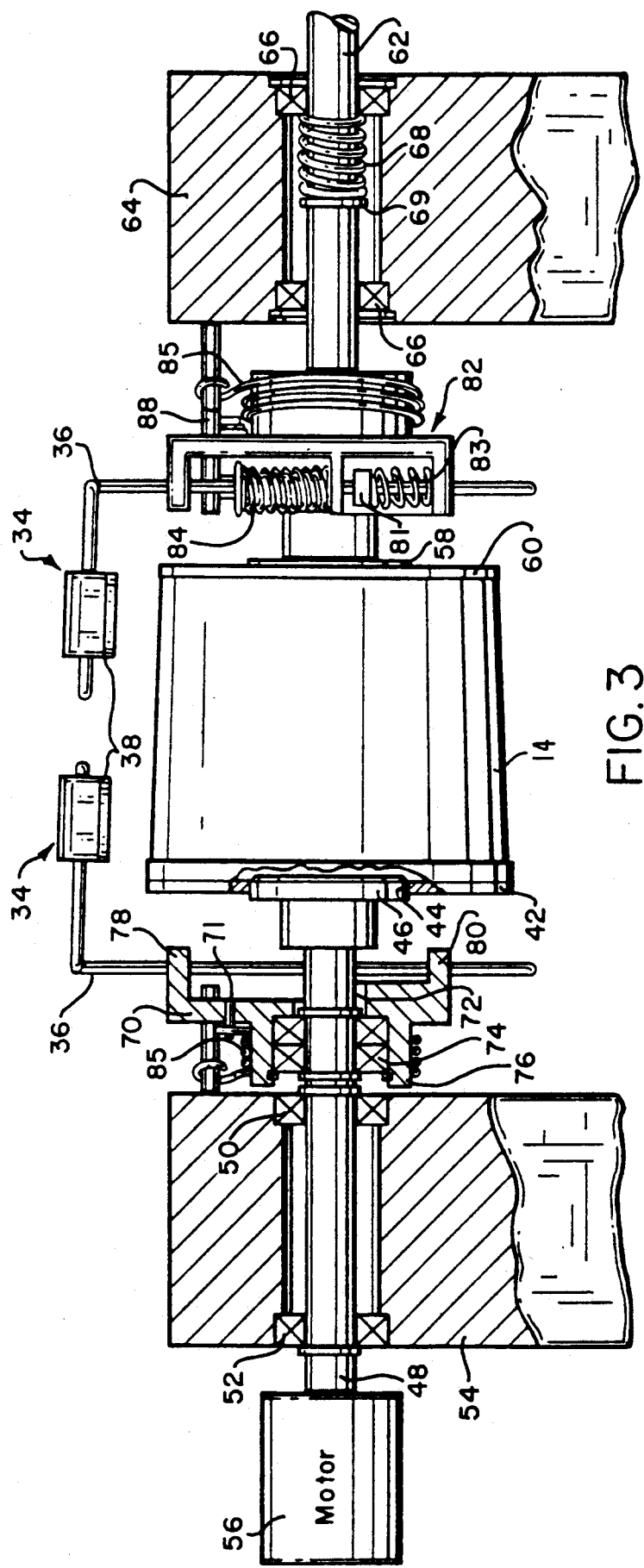
FIG. 3 is a side elevational partially sectional view taken along the line 3—3 of FIG. 2.

Turning now additionally to FIGS. 2 and 3, separate fiber gripping or clamping apparatus 34 are provided at each end of the canister including an actuator arm 36 which, in a way that will be described, can be selectively moved radially upward or radially downward in order to position a gripper pad 38 preferably constructed of foam rubber, for example, into contact with the outer surface of the outermost fiber layer or to release the clamping or gripping of the fibers.

The tapered cylinder winding drum 14 on which the fiber stack is to be wound has an end plate 42 and an opening 44 therein for releasably receiving a drive plate 46. The drive plate is affixed to the end of a shaft 48 which passes through journals 50 and 52 in a first support wall 54 to be coupled at its outer end with a drive motor 56 selectively energizable to apply rotative power to the drum for winding purposes.

Since only one side of the winding drum needs to be powered, the opposite side of the drum includes a further drive plate 58 dimensioned to tightly fit within an opening in the drum end plate 60. Drive plate 58 is affixed to the end of a shaft 62 that is journaled in a further support wall 64 at journals 66.

A coil spring 68 is received upon the shaft 62 and has its ends exerting pressure against both the journal 66 and a C-clip 69 secured to the shaft. To remove the drum from the apparatus, the shaft 62 is moved against the coil spring 68 compressing it, and enabling the drive plate 58 to be removed. Now, the drum may be taken off the fixed drive plate 46. Mounting the drum in the apparatus is accomplished by reversing the described steps.

Each fiber gripping or clamping apparatus 34 includes an elongated body 70 having a central transverse opening 72 through which the shaft 48 passes and within which it is journaled at 74. Specifically, a hub 76 integral with the body 70 faces toward support wall 54 or 64, as the case may be. The opposite side of body 70 has a pair of spaced apart ears 78 and 80 having openings therein for receiving an actuator arm 36 in sliding relation. A magnetic actuator 82 is mounted between each set of ears 78, 80 and the actuator arm 36 is secured to a magnetic actuator armature 81 so that upon energization via a coil 83 the actuator arm with pad will move toward the drum. A coil spring 84 is compressed when the magnetic actuator is energized and when released moves the actuator arm 36 and pad 38 away from contact with the fiber winding top layer. The timing of the two coils 83 energization can be controlled by any one of several conventional techniques, such as interrupting a light beam by selected windings on each layer to connect electric power to the coils 83 via photoelectric means (not shown).

Although there are actually two identically constructed magnetic actuators 82, one for each clamping apparatus 34, for convenience only one is shown in FIG. 3.

A further coil spring 85 is received on the hub 76 and has one end affixed to the body 70 by a screw 71, for example, while the other end of the spring is secured to a limit rod 88 having an end affixed to support wall 54. In the relaxed state, the further spring 85 holds the body in contact with the limit rod. When a pad 38 clamps against a fiber winding on drum 14, further drum rotation causes the body 70, arm 36 and pad 38 carried by the arm to rotate in the direction indicated by arrow 100 away from the limit rod 88 as a unit until the pad clamping action is released, at which time the further spring 85 snaps the body 70 back against the limit rod.

In use of the described apparatus, an unwound drum 14 is mounted between the drive plates 46 and 58 and an end of the optical fiber 12 is anchored to the drum in a conventional manner. A first layer is then wound onto the drum, say left to right as shown in FIGS. 2 and 3. On reaching the last winding of the first layer, the fiber gripping apparatus 34 above that end of the drum is actuated to clamp the last few fiber turns with the pad 38. The drive screw 28 is now turned in the opposite direction starting the second layer which is wound from right to left. With a lower layer end windings being held by the pad, the layer immediately above can be initiated at a predetermined transition within acceptable tolerances. After a new layer is started the pad pressure is released and the layer completed. The procedure is repeated until the desired number of layers have been wound.

Although the invention has been described in connection with a preferred embodiment, it is to be understood that one skilled in the art may make modifications that come within the spirit of the invention and within the ambit of the appended claims.

What is claimed is:

1. Apparatus for winding an optical fiber onto the peripheral surface of a drum, comprising:
    first and second shaft means for respectively supporting opposite ends of the drum for axial rotation;
    first and second fiber clamping means;
    means for selectively and alternately moving the first fiber clamping means into and out of contact with at least one fiber winding adjacent one end of the drum; and
    means for selectively alternately moving the second fiber clamping means into and out of contact with at least one other fiber adjacent the other drum end.

2. Apparatus as in claim 1, in which each clamping means includes a body rotatably mounted onto a respective shaft means, an actuator arm slidably related to the body, and a pad affixed to an end portion of the actuator arm.

3. Apparatus as in claim 2, in which each selective moving means includes a magnetic actuator with a movable armature connected to a clamping means actuator arm.

4. Apparatus as in claim 2, in which there is further provided a limit rod mounted on each support wall, and spring means on each clamping means body resiliently urging said clamping means body against a limit rod.

5. Apparatus as in claim 2, in which the pad is constructed of a soft to the touch material.

6. Apparatus for winding an optical fiber onto the peripheral surface of a drum, comprising:
    first and second shafts respectively supporting opposite ends of the drum for axial rotation;
    first and second fiber clamping means each including,
    a body rotatably mounted onto a respective shaft,
    an actuator arm slidably related to the body, and
    means for selectively moving the first and second fiber clamping means respectively into contact with at least one different fiber winding on the drum and for moving the clamping means out of contact with the said at least one fiber windings, each said selective moving means including a magnetic actuator with a movable armature connected to a clamping means actuator arm.

7. Apparatus as in claim 6, in which there is further provided a limit rod mounted on each support wall, and spring means on each clamping means body resiliently urging said clamping means body against a limit rod.

8. Apparatus as in claim 6, in which the pad is constructed of foam rubber.

9. Apparatus for winding an optical fiber onto a drum, comprising:
   means for mounting said drum for axial rotation;
   a body rotatably received on said mounting means;
   fiber clamping means including
   an actuator arm slidably related to the body, and
   a foam rubber pad affixed to an end portion of the actuator arm; and
   means for selectively moving the fiber clamping means into contact with at least one fiber winding on the drum and for moving the clamping means out of contact with the at least one fiber winding, said selective moving means including a magnetic actuator with a movable armature connected to a clamping means actuator arm.

* * * * *